Feb. 24, 1942.       E. VENABLE       2,274,388
HYDROGEN ABSORBER
Filed April 26, 1940
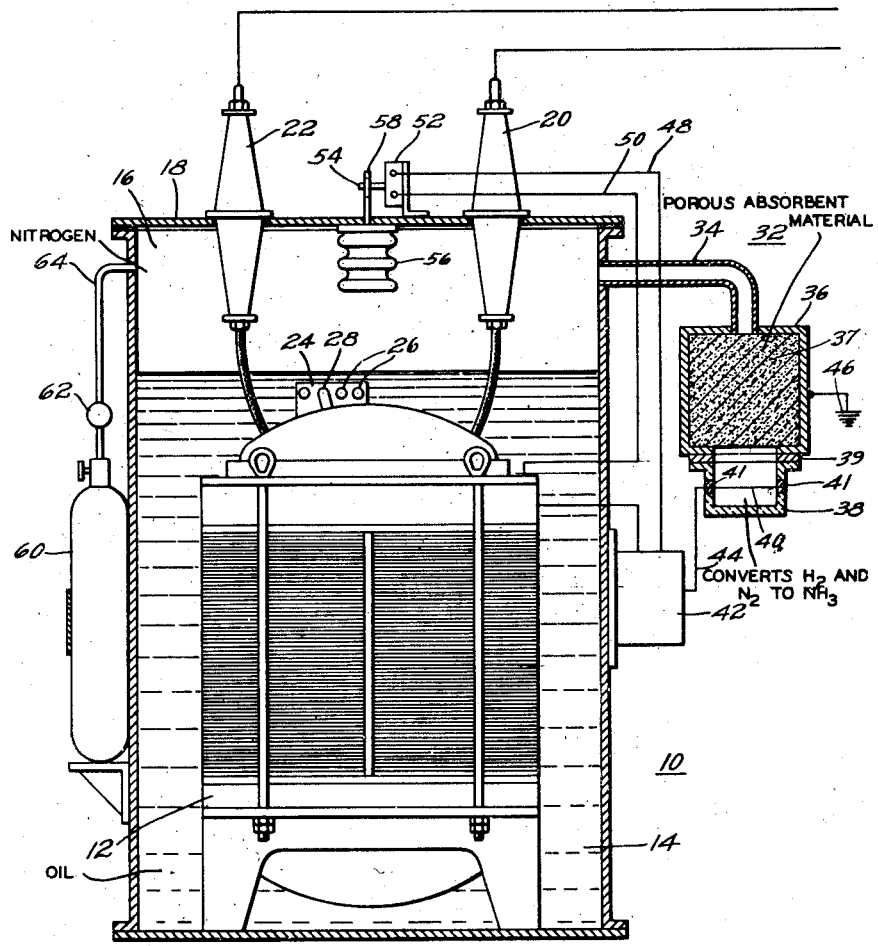
WITNESSES:
INVENTOR
Emerson Venable.
BY
ATTORNEY Patented Feb. 24, 1942

2,274,388

UNITED STATES PATENT OFFICE 2,274,388

HYDROGEN ABSORBER

Emerson Venable, Wilkinsburg, Pa., assignor to Westinghouse Electric & Manufacturing Company, East Pittsburgh, Pa., a corporation of Pennsylvania Application April 26, 1940, Serial No. 331,813

8 Claims. (Cl. 174—14)

This invention relates to protective equipment, and particularly protective devices to be employed in conjunction with electrical apparatus insulated with liquid dielectrics giving rise to hydrogen.

Electrical apparatus insulated with liquid dielectrics such as oil, when subjected to arcing either due to operation of the apparatus or due to failure of the electrical elements, are subject to decomposition to produce considerable amounts of combustible gases, particularly hydrogen. Explosions and fires of a disastrous nature have occurred due to the hydrogen gases generated.

The object of this invention is to provide for the removal of hydrogen from electrical apparatus.

Other objects of the invention will, in part, be obvious and will, in part, appear hereinafter.

The invention accordingly comprises the features of construction, combination of elements, and arrangement of parts which will be exemplified in the construction hereinafter set forth, and the scope of the application of which will be indicated in the claims.

For a fuller understanding of the nature and objects of the invention, reference should be had to the following detailed description taken in connection with the accompanying drawing, in which the single figure is a view in section of a transformer equipped with the protective device.

The protective device according to the invention is based upon the removal of hydrogen as it is generated within the oil dielectric by arcing. The protective device may be used with any other type of electric apparatus employing oil which may be subjected to decomposition on arcing to produce hydrogen gas.

Referring to the figure of the drawing, there is illustrated a closed transformer 10 having a transformer core 12 submerged within the liquid dielectric 14 and having a space 16 filled with an inert gas such as nitrogen above the dielectric. The high voltage connections 20 and 22 to the transformer consist of the usual insulating bushings.

A tap changer 24 comprising a plurality of contacts 26, and a tap changing contact 28, is connected to the transformer windings in order to obtain variable high voltage. The tap changer is submerged within the oil or liquid dielectric. The tap changing mechanism is intended to function while the transformer is under load. Consequently, an arc of considerable strength is developed when the contact members 26 and 28 are separated during tap changing. The arc reacts to decompose the liquid dielectric immediately adjacent the arc. The decomposed oil forms a gas which consists in great part of hydrogen. The hydrogen rises into the space 16.

The protective attachment with which it is proposed to equip the transformer in order to remove the hydrogen consists of the unit 32. The unit 32 is connected air-tightly with the transformer by means of a gas-conveying tube 34. The tube 34 opens at one end to the transformer space 16. The end of the gas-conveying tube 34 remote from the transformer 10 is connected to an enlarged chamber 36 within which is located a porous mass 37 of absorbent material, such as silica gel or pumice impregnated with copper sulphate. This porous absorbent mass 37 is permeable to gases such as nitrogen, oxygen and hydrogen which may be present in the space 16.

The portion of the chamber 36 remote from tube 34 has attached thereto a reaction chamber 38 within which a high tension, corona generating wire 40 is located.

The reaction chamber 38 may be made of glass or other insulating material. A construction which is airtight, may be made by employing a borosilicate glass for body 38 and an alloy known as Kovar for the attaching ring 39 and wire seals 41. The borosilicate glass is fusible to Kovar. The patent to H. Scott No. 1,942,260 discloses the composition of Kovar.

In some instances chamber 38 may be constructed of metal, such as steel, with Kovar and glass insulators welded thereto for retaining wire 40 in place.

The wire seals 41 may be fused to the glass chamber 38, after which wire 40 may be welded to seal 41 at each end. Ring 39, after being fused to reaction chamber 38, may be welded or soldered to chamber 36, which may be made of steel.

The high voltage side of a transformer 42 is connected to wire 40 by a conductor 44. A ground conductor 46 is attached to chamber 37. Low voltage current for the transformer 42 is supplied by conductors 48 and 50.

In some instances the low voltage current to transformer 42 may be supplied continuously, in which case the conductors 48 and 50 are directly attached to the low voltage line leading to the transformer.

The figure of the drawing illustrates a modified form of current supply to transformer 42. In the illustration, current is supplied when the gas pressure in space 16 exceeds a certain amount. A pressure sensitive bellows 56 has a switching arm 58 acting on switch arm 54 with a certain amount of lost motion to compensate for atmospheric and temperature changes. Switch 52 is turned to the on position when the lost motion in arm 58 has been taken up due to excess gas having been generated by oil decomposition. When the hydrogen has been absorbed, then the pressure will fall and switch 52 will be turned off.

The wire 40 is maintained at a voltage of from 10 to 25 kilovolts through the medium of the auxiliary transformer 42 connected to the terminals of the main transformer 10. Thus, when the main transformer 10 is in operation, the auxiliary transformer 42 also will be in operating condition and a continuous supply of high voltage current at wire 40 will be available. Only a small amount of current is necessary for this purpose.

In some instances where the high voltage side of the transformer has sufficient voltage to operate the reaction chamber (10 to 25 k. v.) then wire 41 may be directly attached thereto.

The function of the protective device is as follows. The combustible gases, particularly hydrogen, present in space 16 will permeate rapidly through the air-conveying tube 34, through the porous mass 37 in chamber 36 and enter the reaction chamber 38. The high voltage wire 40 causes gas ionization or corona. The effect of the corona is to cause combination of the hydrogen with the other gases present, particularly nitrogen. At room temperature and normal pressures, the hydrogen and nitrogen will combine to form ammonia according to the following formula:

$$3H_2 + N_2 \rightarrow 2NH_3$$

The ammonia formed diffuses back to the porous silica gel mass 37 in chamber 36 and is immediately absorbed quantitatively. The reaction tends to irreversibility since the ammonia is so readily removed.

If oxygen is present water will be formed and be absorbed by the absorbing mass 37.

The reaction chamber 38 is separated from the main space 16 by the permeable mass 37 in order to prevent combustion of the hydrogen with other gases, particularly any oxygen which may be present in the space 16. The remote position of reaction chamber 38 assures a localized chemical action in removing the hydrogen. Thus danger of explosion is avoided.

A test setup containing 920 c. c. of gas was built to simulate the protective device as shown in the figure of the drawing. The following typical results were obtained.

| Gas composition | Corona time | Results |
| --- | --- | --- |
| | Minutes | |
| 14.7% H₂ in N₂ | 63 | 16.3% loss in volume (150 c. c. volume change). |
| 12.0% H₂ in N₂ | 13 | 7.7% loss in volume. |
| Pure N₂ | 42 | No change. |

The test results in the above table were made in the presence of a standard transformer oil.

Reduction of the hydrogen gas to below 3% in space 16 is satisfactory to avoid possible explosions.

The reaction of hydrogen and nitrogen results in a decrease in volume since the nitrogen gas is removed. However the transformers may be equipped with a member responsive to reduced pressures to admit air to prevent a vacuum.

In some instances, a bottle of compressed nitrogen 60, equipped with a reducing valve 62, may be connected by line 64 to space 16 to maintain sufficient gas pressure. Such auxiliary equipment, it is contemplated, will maintain the gas pressure within the transformer corresponding to or slightly above atmospheric but will not interfere with the generation of sufficient overpressure to operate the pressure responsive switch.

The protective device will effectively reduce the hydrogen gas concentration to such a value that the breakage of safety diaphragms due to minor explosions will be prevented. It will operate under the normal temperature and pressure conditions found in transformers.

Other electrical apparatus, such as circuit breakers, capacitors and equipment employing oil or a dielectric decomposing into hydrogen may be equipped with the protective device.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. A protective device for electrical apparatus provided with a dielectric subject to decomposition by arcing to form gases and an inert gas for protection purposes, comprising, in combination, means for effecting chemical combination of the gaseous products of decomposition with the inert gas, absorptive means associated with the means for effecting chemical combination, the absorptive means cooperating to absorb the products of the chemical combination.

2. A protective device for electrical apparatus provided with a dielectric subject to decomposition to generate hydrogen gas by arcing and a supply of gas including nitrogen for protective purposes, comprising, in combination, means for effecting chemical combination of the hydrogen gas and the nitrogen gas, means for absorbing the products of chemical combination associated with the means for effecting the chemical combination.

3. A protective device for electrical apparatus provided with a liquid dielectric subject to decomposition to generate hydrogen gas by arcing and a supply of gas including nitrogen for protective purposes, comprising, in combination, electrical means for effecting chemical combination of the hydrogen gas and the nitrogen gas, solid means for absorbing the products of chemical combination associated with the electrical means for effecting the chemical combination.

4. A protective device for electrical apparatus provided with a liquid dielectric subject to decomposition by arcing in the electrical apparatus to evolve objectionable gases, and an inert gas for protective purposes, comprising, in combination, electrical means for effecting chemical combination of the inert gas and the evolved gas and means for absorbing the products of chemical combination permeable by the inert and evolved gases and disposed between the electrical apparatus and the electrical means, the means for absorbing cooperating with the electrical means to admit the evolved and inert gases to the electrical means for effecting chemical combination thereof, and to absorb the products of the chemical combination.

5. A protective system for electrical apparatus insulated with liquid dielectric subject to decomposition by arcing in the electrical apparatus to generate hydrogen gas, and a nitrogen gas for protective purposes, comprising, in combination, means for removing the generated hydrogen gas, including electrical means for effecting chemical combination of the hydrogen and nitrogen, and means for absorbing associated with the means for effecting chemical combination to absorb the products of chemical combination, the electrical means cooperating with the electrical apparatus whereby both are simultaneously energized by electrical current during operation of the electrical apparatus.

6. A protective system for electrical apparatus insulated with liquid dielectric subject to decomposition by arcing in the electrical apparatus to generate hydrogen gas, and a nitrogen gas for protective purposes, comprising, in combination, means for removing the generated hydrogen gas, including means for effecting chemical combination of the hydrogen and nitrogen and porous solid means for absorbing the products of chemical combination permeable to hydrogen and nitrogen gases disposed between the electrical apparatus and the means for effecting chemical combination, and the porous solid means, means cooperatively associated therewith to admit the hydrogen and nitrogen gases to the means for effecting chemical combination and to absorb the resulting products of chemical combination.

7. A protected, sealed electrical apparatus comprising a container, electrical members in the container, a dielectric liquid within the container covering a portion of the electrical members, the liquid dielectric generating hydrogen gas when subjected to arcing, a space above the dielectric liquid, a protective system in operative communication with the space, the protective system comprising a porous member for absorbing the products of chemical combination of hydrogen, and a reaction chamber separated from the space by the porous member, the porous member admitting hydrogen and other gases from the space to the reaction chamber, the reaction chamber having electrical means for effecting chemical combination of the hydrogen and other gases to form products of chemical combination of hydrogen absorbable by the porous member to thereby effect removal of the generated hydrogen gas from the electrical apparatus.

8. A protected, sealed electrical apparatus comprising, in combination, a sealed casing, operative electrical elements in the casing, a dielectric fluid in the casing, the dielectric fluid being characterized by a decomposition to form hydrogen gas when subjected to arcing during operation of the electrical elements, a gas space above the dielectric fluid consisting mainly of a supply of nitrogen gas, means for replenishing said supply of nitrogen gas, a protective system for removing the hydrogen gas in operative communication with the gas space, the protective system comprising an enclosed reaction chamber including a porous partition member, the porous partition member admitting the hydrogen and nitrogen gases to the enclosed reaction chamber from the gas space, electrical means in the reaction chamber for causing the nitrogen and hydrogen to react to form products of chemical combination, absorbent means cooperating with the reaction chamber to absorb the products of chemical combination and prevent their escape therefrom, the electrical reacting means being controlled by a gas pressure operated switch responsive to pressures above atmospheric in the gas space resulting from the occurrence of hydrogen gas to cause current to flow to the electrical means.

EMERSON VENABLE.